United States Patent [19]
Jacquot et al.

[11] 3,744,697
[45] July 10, 1973

[54] APPARATUS FOR THE FABRICATION OF AN INSULATING PANE UNIT

[75] Inventors: Michel Jacquot, Beynes; Charles Amicel, Carrieres/Seine, both of France

[73] Assignee: Boussois Souchon Neuvesel, Paris, France

[22] Filed: June 1, 1971

[21] Appl. No.: 148,518

[30] Foreign Application Priority Data
June 16, 1970 France .............................. 7022107

[52] U.S. Cl. .................... 228/5, 29/472.5, 228/5
[51] Int. Cl. .............................................. B23k 1/20
[58] Field of Search ................... 65/58, 156, 154; 29/240, 472.5; 228/5, 15, 3.5

[56] References Cited
UNITED STATES PATENTS

| | | | |
|---|---|---|---|
| 3,543,385 | 12/1970 | Javaux et al. ...................... | 29/472.5 |
| 3,273,988 | 9/1966 | Dean et al. ......................... | 65/58 X |
| 3,131,046 | 4/1964 | Dennett et al. .................... | 65/58 |
| 3,103,137 | 9/1963 | Charschan ......................... | 78/82 |
| 2,995,869 | 8/1961 | Cowley ............................... | 65/58 |
| 2,235,681 | 3/1941 | Haven et al. ...................... | 29/472.5 |

Primary Examiner—J. Spencer Overholser
Assistant Examiner—Robert J. Craig
Attorney—Young & Thompson

[57] ABSTRACT

The disclosure relates to an apparatus for fixing an intercalary sectional strip on a rectangular glass pane. In accordance with the disclosure, a portion of a continuous sectional strip is placed in contact with a first side of one face of the pane which is carried by a lifting device; this portion of strip is fixed on said first side by means of soldering devices; the plate is displaced in pivotal motion by means of a movable table which is traversed by a rotary suction cup in order to place a second side in contact with a following portion of strip; this portion of strip is fixed on said second side; the preceding cycle of operations is repeated for the following sides, the strip is cut to the necessary length, the intercalary sectional strip is closed and thus fixed on the glass pane. The disclosure is applicable to the fabrication of insulating pane units.

20 Claims, 34 Drawing Figures

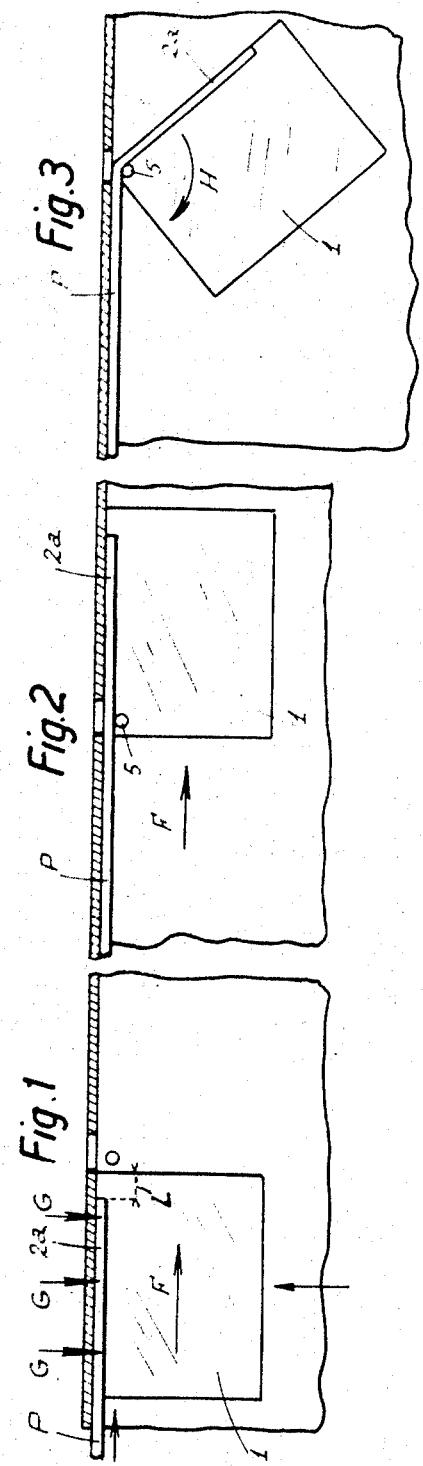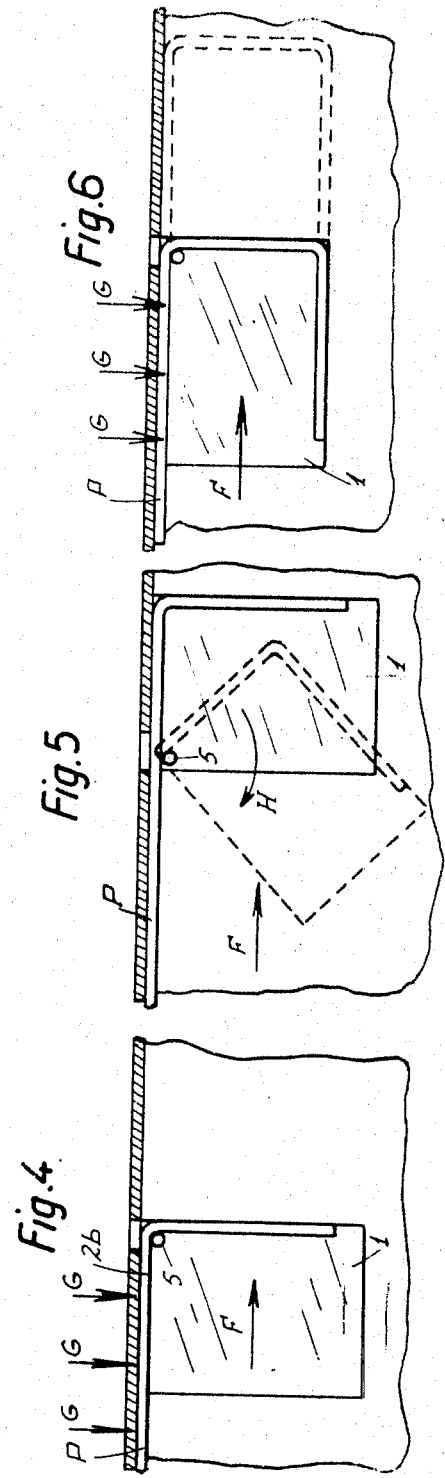

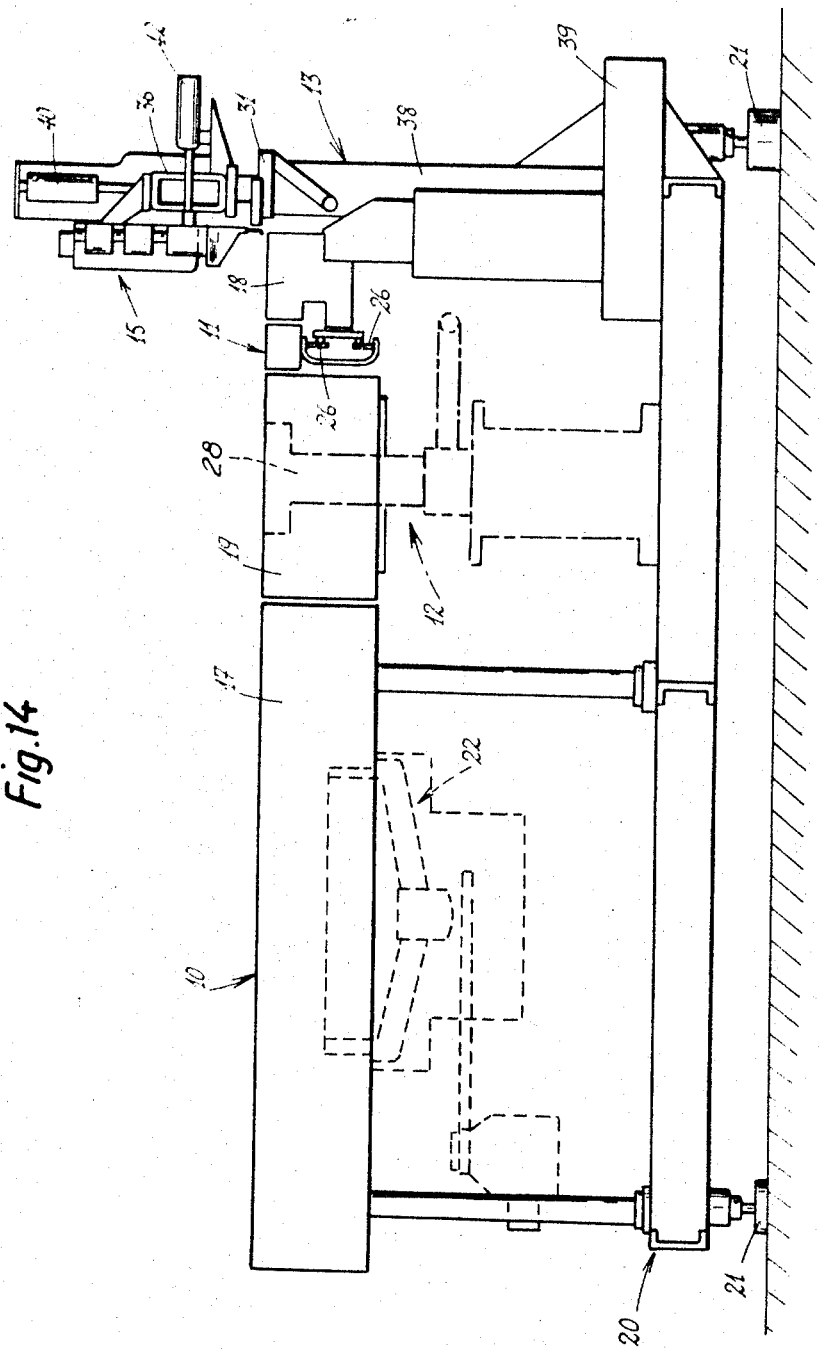

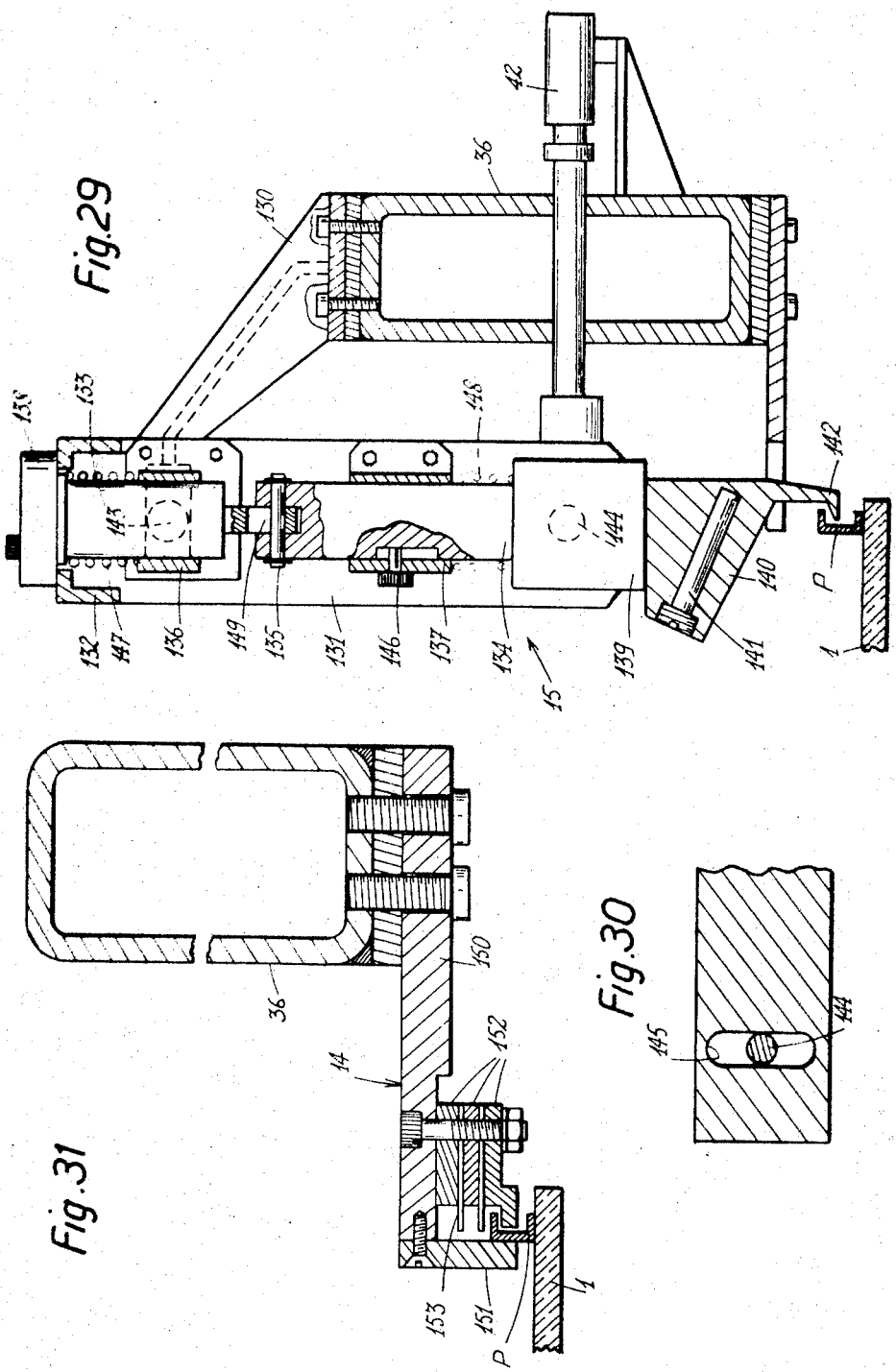

APPARATUS FOR THE FABRICATION OF AN INSULATING PANE UNIT

This invention relates to an apparatus for fixing an intercalary sectional strip on a rectangular glass pane, especially for the fabrication of an insulating double-pane unit consisting of two sheets of plate glass which are separated from each other by means of an intercalary U-section strip.

It is known that, in insulating pane units of this type, the function of the intercalary strip is to ensure mechanical strength of the assembly and leak-tightness of the internal space which is filled with dehydrated air.

Until recent years, the fabrication of pane units of this type was performed by hand and was subjected to many disadvantages. The present applicant has developed a method and a device for simultaneous soldering of the two flanges of a metallic intercalary U-section strip along the edges of two glass panes placed in oppositely-facing relation; this method and device form the subject of U.S. Pat. No. 3,698,619 in the name of the present applicants.

The invention is concerned with the series of operations which are necessary in order to attach the intercalary sectional strip to one of the panes, said operations being carried out prior to final assembly of the pane unit by soldering.

These operations were carried out up to the present time either solely by hand and starting from a straight strip which was not usually shaped, thus entailing both skilful performance and high capital expenditure, or by previously shaping a spacer member and welding the ends so as to form a frame which was then positioned and bonded between two opposite panes of glass. The solution which has just been mentioned is disclosed in French Pat. No 1,279,014 but is attended by many disadvantages, chief among these being the resultant deformation of the frame at the time of positioning between the glass panes.

The aim of this invention is to perform the above-mentioned operations in a fully automatic process which permits attachment of intercalary sectional strips to glass panes with a high degree of efficiency without any potential danger of defects.

In accordance with the invention, the method for fixing an intercalary sectional strip on a rectangular glass pane especially for the fabrication of an insulating pane unit constituted by two sheets of plate glass which are separated by an intercalary U-section strip comprises the steps of placing one portion of a continuous sectional strip in contact with a first side of one face of the pane, fixing said portion of strip on said first side, causing the pivotal displacement of the pane in order to apply a second side which is adjacent to the first in contact with a following portion of strip, fixing said portion of strip on said second side, repeating the preceding cycle of operations for the following sides, cutting the strip to the necessary length and folding back the end of the intercalary strip which is thus fixed on the pane, wherein said method essentially consists, after each step involving attachment of one portion of strip and prior to rotation of the pane, in displacing the horizontally disposed pane in translational motion parallel to and over a distance substantially equal to the side which has been fitted with said portion of strip, the movements of rotation of the pane being carried out substantially about a single fixed point.

Steps are thus taken to avoid displacement of the means for fixing the sectional strip, the pane being alone subjected to displacements in translational and rotational motion.

It is then only necessary to place the second pane on the intercalary strip and opposite to the first pane and to bond the complete assembly preferably in accordance with the method described in the above-cited patent application.

In accordance with the invention, the apparatus for carrying out the method referred-to above essentially comprises a lifting device for the glass pane comprising at least one stationary table, a device for displacing said glass pane in pivotal motion in its plane, means for guiding the sectional strip on one side of the lifting device, means for fixing the sectional strip on the pane and means for cutting said strip.

The apparatus preferably comprises a carriage which is displaceable in translational motion and is intended to displace the glass pane above the table in a direction parallel to the forward motion of the sectional strip.

In accordance with one advantageous feature, the guiding means, the fixing means and the strip-cutting means are mounted on the beam of a gantry which is arranged on one side of the lifting device.

In a preferred embodiment, the device for causing pivotal displacement of the glass pane comprises a movable table which also forms part of the lifting device, said table being capable of translational motion parallel to the carriage and provided with an opening in the form of an elongated slot, an element for holding the pane being engaged in said slot and mounted for rotation about an axis located at right angles to the plane of the table.

By virtue of this arrangement, there exists only a very small non-lifting surface which corresponds to the opening in the form of an elongated slot.

Further properties of the invention will become apparent from the description which now follows, reference being made to the accompanying drawings which are given by way of non-limitative example, and in which:

FIGS. 1 to 10 are diagrammatic views illustrating the successive steps of the method in accordance with the invention;

FIG. 14 is a sectional view taken along line XIV—XIV of FIG. 13;

FIG. 29 is a vertical part-sectional view of a soldering device;

FIG. 30 is a sectional view of a detail of the soldering device of FIG. 29;

FIG. 31 is a vertical sectional view of the means for guiding the sectional strip;

Figure 12:
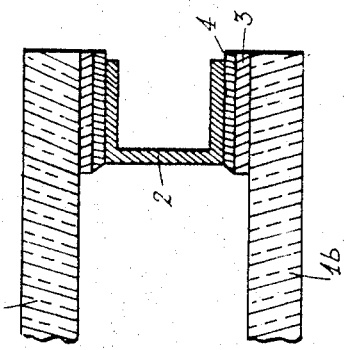
FIG. 12 is a view which is similar to FIG. 11 and showing the assembled pane unit.

Referring now to FIG. 12 of the accompanying drawings, there is shown an insulating pane unit which is intended to be fabricated in accordance with the invention. Said unit is made up of two flat glass panes $1a$, $1b$ which are either of square or rectangular shape and consist of plate glass, for example. Said panes are maintained in spaced relation by means of a metallic intercalary strip 2 having a U-shaped cross-section, the design function of said strip being to endow the complete unit with mechanical strength and to ensure leak-tightness of the internal space which is filled with dehydrated air.

The opposite edges of the glass panes $1a$, $1b$, are coated with a thin layer 3 of copper which exhibits good adhesion to the glass, said coating being soldered to a layer 4 of tin which adheres strongly to the intercalary strip, thus ensuring high strength of the assembly.

FIGS. 1 to 10 illustrate the method according to the invention for fixing an intercalary sectional strip on a rectangular glass pane for the purpose of fabricating the insulating pane unit which is illustrated in FIG. 12. Fixing of the strip precedes the operation which consists in soldering the flanges of said strip along the edges of two opposite glass panes, said soldering operation being preferably carried out in accordance with the method described in the above-identified U.S. Pat. No. 3,698,619.

The essential steps of the method will first be described with reference to FIGS. 1 to 10. The glass pane 1 on which an intercalary sectional strip is intended to be fixed is displaced in a horizontal plane in the direction F (as shown in FIG. 1) whilst a continuous strip P is delivered from a drum and progresses in a direction parallel to the pane but at the edge of this latter and on a long side of said pane. The glass pane and the sectional strip are secured in such a manner as to ensure that a portion of strip $2a$ does not extend to the full length of a long side of the pane, a short length L of this first side being thus left free at the front end of the pane. The portion of strip $2a$ is then fixed on the pane at three points, for example, as indicated by the arrows G and preferably by soldering. This ensures that said portion of strip is temporarily but sufficiently firmly attached to the pane.

The glass pane which is fitted with said portion of strip is then displaced in translational motion again in the direction F and over a distance which is substantially equal to the length of its long side (as shown in FIG. 2). During this movement of translation, the sectional strip P is displaced by the pane while being guided.

The pane 1 is then subjected to a movement of rotation through an angle of 90° about a point 5 located in the rear corner of said pane which is adjacent to the strip whilst the portion of strip $2a$ is also bent around this point (as shown in FIG. 3). Rotation is carried out in the direction of the arrow H, that is to say towards the upstream end with respect to the direction of displacement in order to place a second side of the pane which is adjacent to the first in contact with a following portion of strip without thereby resulting in displacement of the means employed for fixing said strip (as shown in FIG. 4). The second portion of strip $2b$ is fixed in the direction of the arrows G as in the previous instance but soldering is carried out only at two points since the second side is a short side of the pane.

Figure 7:
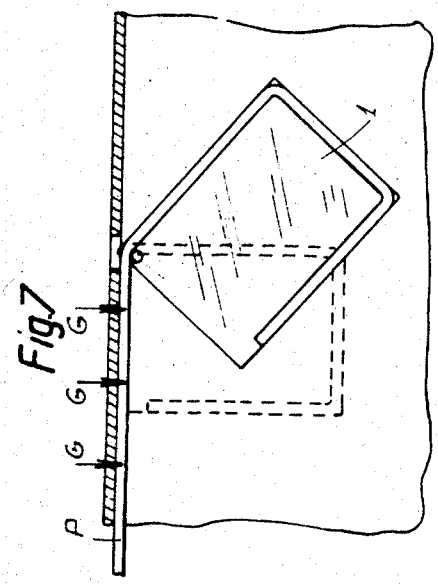

The cycle of operations just described is repeated in the case of the following sides of the pane as can be seen from FIGS. 5 to 7.

Figure 8:
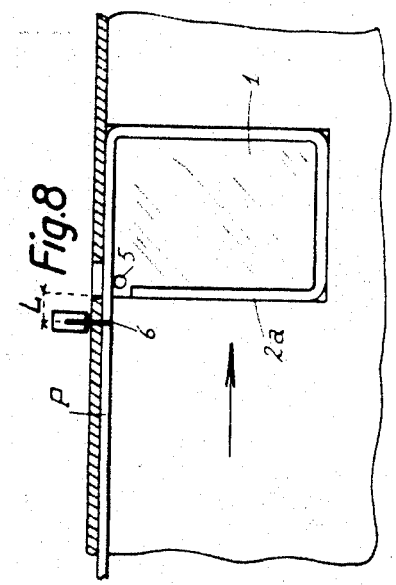

When the fourth side of the pane is fitted with its portion of strip, cutting of the strip P is then carried out slightly upstream of the pane and at a point 6 so that the excess length thus obtained should be equal to the distance L which remained free on the first side of the pane (as shown in FIG. 8).

Figure 10:
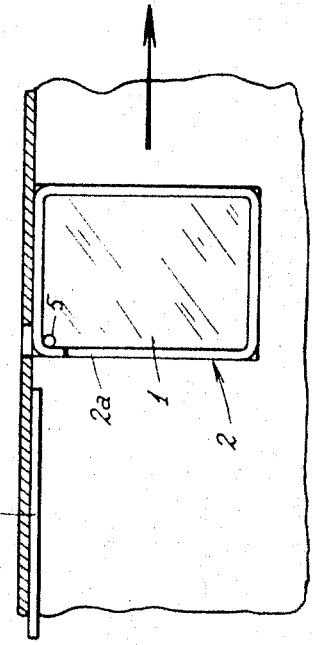
Figure 9:
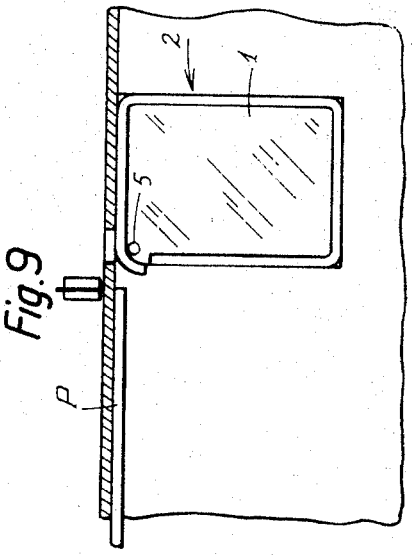
Figure 11:
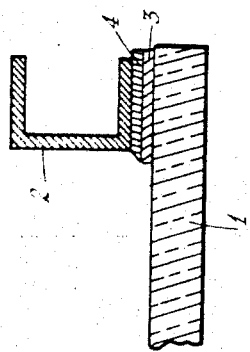
FIG. 11 is a fragmentary sectional view showing the glass pane which is fitted with the intercalary sectional strip.

This length of strip is then folded-back around the fixed point 5 (as shown in FIG. 9) and is thus joined to that portion of strip $2a$ which was fixed on the first side of the pane (as shown in FIG. 10); this length of strip which has thus been folded back is then bonded to the pane. The pane which is fitted with the intercalary strip 2 can then be directed towards the soldering device which was described in the above-cited patent application. FIG. 11 illustrates the glass pane which is fitted with the intercalary strip as thus obtained, the edges of the pane having previously been coated with two layers 3 and 4 respectively of copper and tin. The spot-soldering operation which ensures temporary bonding of the intercalary sectional strip to the glass pane is then completed by the soldering operation which is preferably carried out in accordance with the method described in the above-cited patent application in order to produce the insulating pane unit which is illustrated in FIG. 12.

Figure 13:
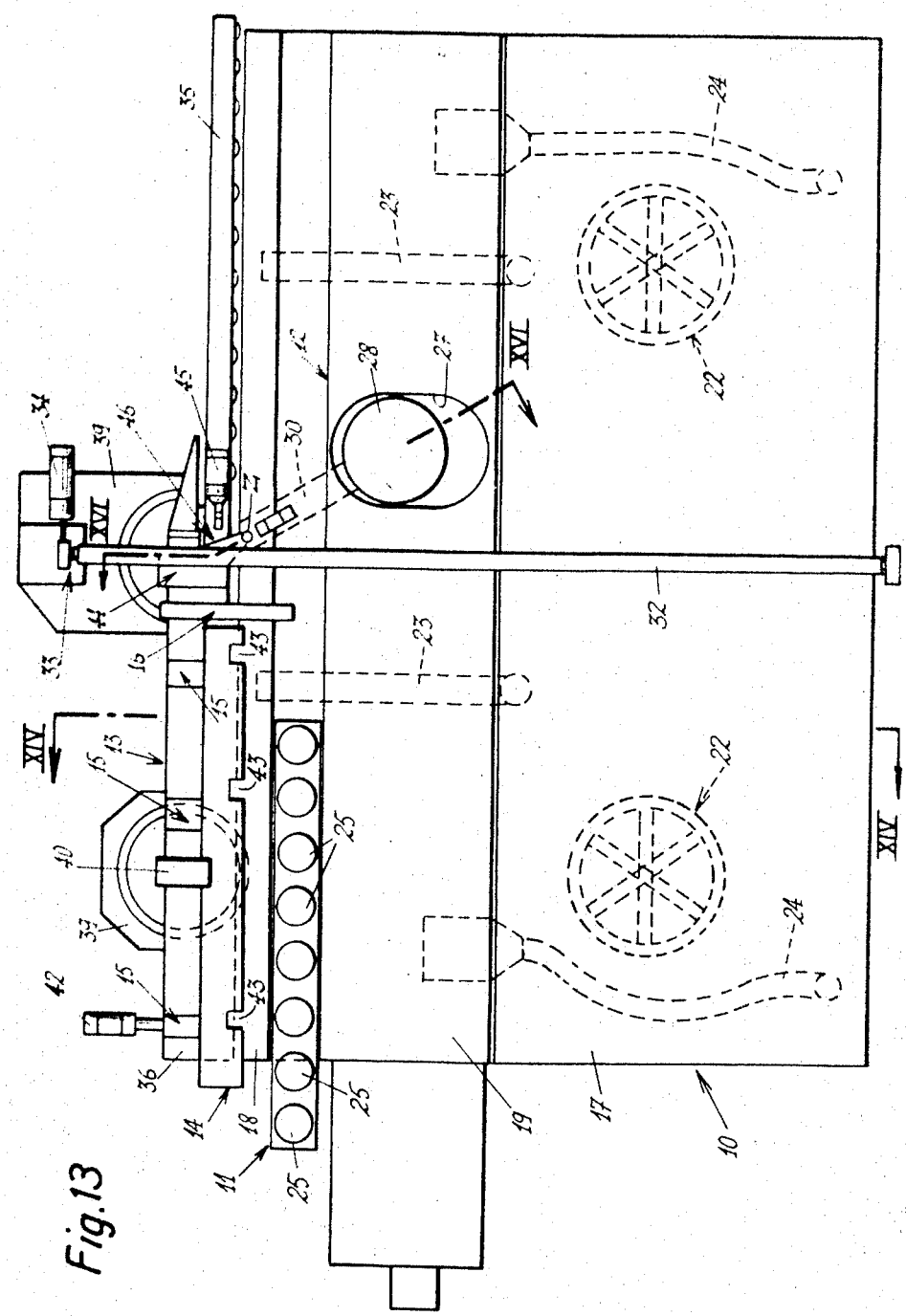
FIG. 13 is a general diagrammatic plan view of the apparatus in accordance with the invention.

The apparatus for carrying out the method which has just been described essentially comprises as shown in FIGS. 13 and 14 a lifting device 10 for the glass pane; a carriage 11 which is capable of translational motion and adapted to displace the pane; a device 12 for displacing the pane in pivotal motion in its plane; a grantry 13 which is mounted on one side of the lifting device and carries a guide 14 for the sectional strip which is unwound continuously, spot-soldering devices 15 and a device 16 for cutting the sectional strip.

The support device 10 comprises two stationary box elements 17, 18 which form a stationary table and which are separated by the carriage 11 and by a movable box element 19 which forms part both of the lifting device and the device 12 which is intended to displace the pane in pivotal motion. The assembly is carried by a frame 20 on jacks 21 which permit the possibility of tilting this latter.

Provision is made within the box element 17 for blowers 22 which are intended to produce an excess air pressure within the interior of said box element as well as within the stationary box element 18 and the movable box element 19 by means of fixed pipes 23 and flexible pipes or hoses 24. The top surface of the box elements is provided with a large number of small holes (not shown) through which the air under pressure is discharged and thus produces an air cushion which is capable of supporting a glass pane.

The carriage 11 is provided with a series of suction cups 25 for taking hold of a glass pane which has been deposited on the lifting device aNd for displacing said pane in translational motion. This carriage is capable of running along a rail 26 by means of rollers (not shown). The same arrangements are made in the movable box element 19 but the rails provided for this element are not illustrated.

The movable box element 19 has an opening in the form of an elongated slot 27 in which is engaged a holding element 28 consisting of a suction cup which is intended to take and transfer a glass pane.

The suction cups 25 and 28 are of known type and operate under the action of a partial vacuum, for example, so that a glass pane can be applied against the suction cups as a result of the pressure difference which is exerted on the top and bottom faces of the pane when the suction cups are in operation. The suction cups 25 of the carriage can preferably be actuated selectively in order that a suitable number of suction cups may be employed according to the dimensions of the glass pane.

The pipes and source of supply of the suction cups 25, 28 have been omitted from the drawings as well as the means for driving the carriage 11 and the movable box element 19 which are of conventional type such as a closed chain which is driven from a motor by means of a sprocket-wheel.

Figure 16:
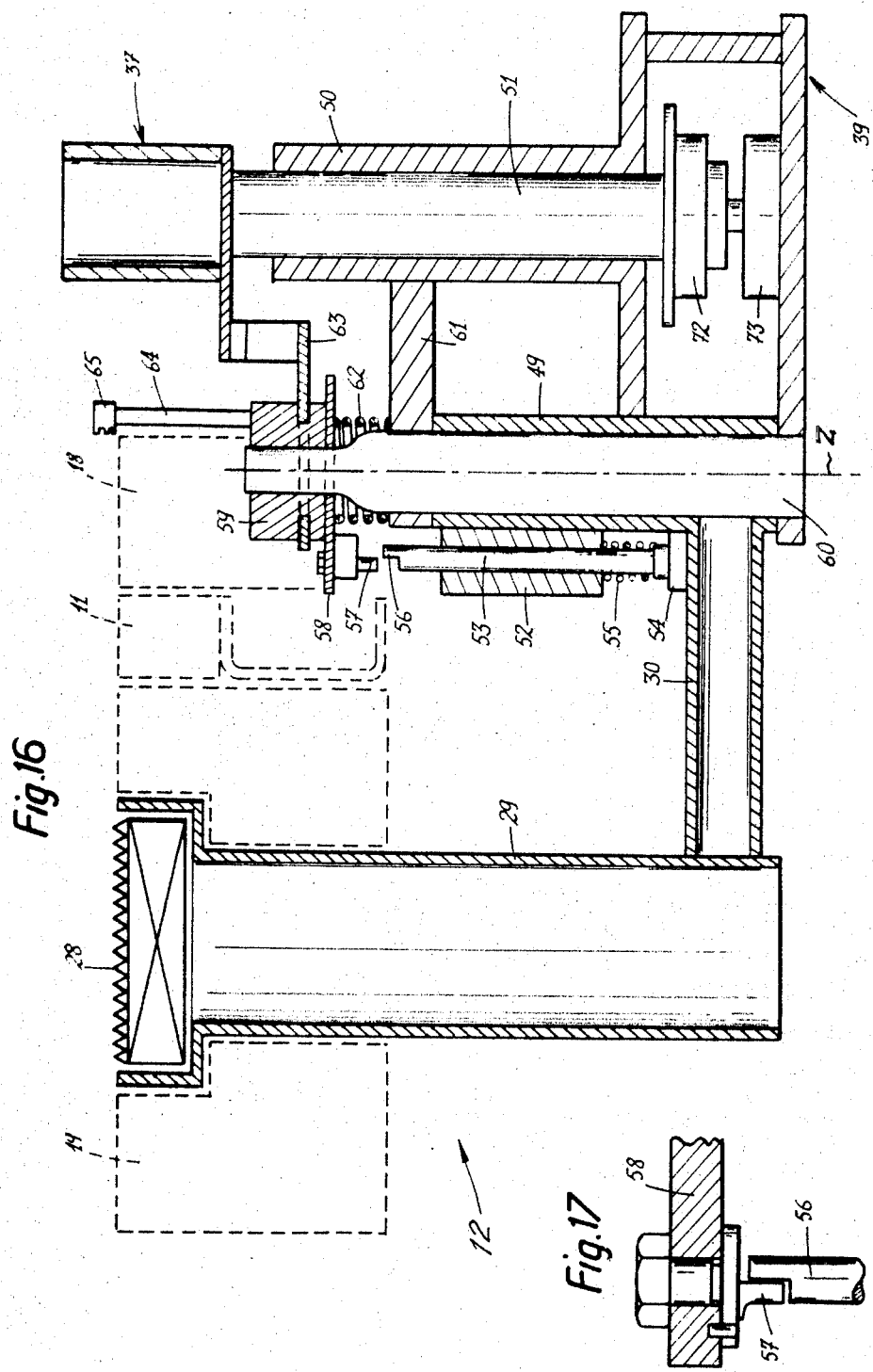
FIG. 16 is a part-sectional view on a larger scale and taken along line XVI—XVI of FIG. 13.

As shown in FIG. 16, the suction cup 28 which is level with the top surface of the movable box element 19 is carried by a rod 29 and this latter is rigidly fixed to a horizontal arm 30 which is mounted so as to permit rotation about a vertical axis Z. Rotation of the arm 30 as a result of translational motion of the movable box element 19 therefore makes it possible to cause pivotal motion of a glass pane which is supported on the box-element assembly but held by the suction cup 28.

As shown in FIGS. 13 and 14, the apparatus is further provided with devices which serve to center or to position the glass pane and comprise two edge guides 31 and 32, the first guide being intended to extend along one side of the stationary box element 18 and in the vicinity of the strip guide 14 and the second edge guide being intended to extend at right angles to the first and therefore transversely to the box elements which form the lifting device. The first edge guide 31 is rigidly fixed to the stationary box element 18 and is provided with stops which are capable of withdrawing as a result of pivotal motion about a horizontal axis which is parallel to the direction of displacement of the carriage 11. The edge guide 32 is carried by a transverse gantry 33 and is provided with aligned rollers which, under the action of a jack 34, are capable of support and pivoting about a horizontal axis at right angles to the direction of displacement of the carriage 11. This enables the glass pane to pass freely from the left-hand portion of the support device towards the right-hand side. Another edge guide 35 of the type comprising aligned and retractable vertical axis rollers is disposed horizontally in alignment with the edge guide 31. At the end of the operations, the glass pane contacts the rollers of edge guide 35, the rotation of which serves to disengage the glass pane when the operation is completed.

Figure 15:
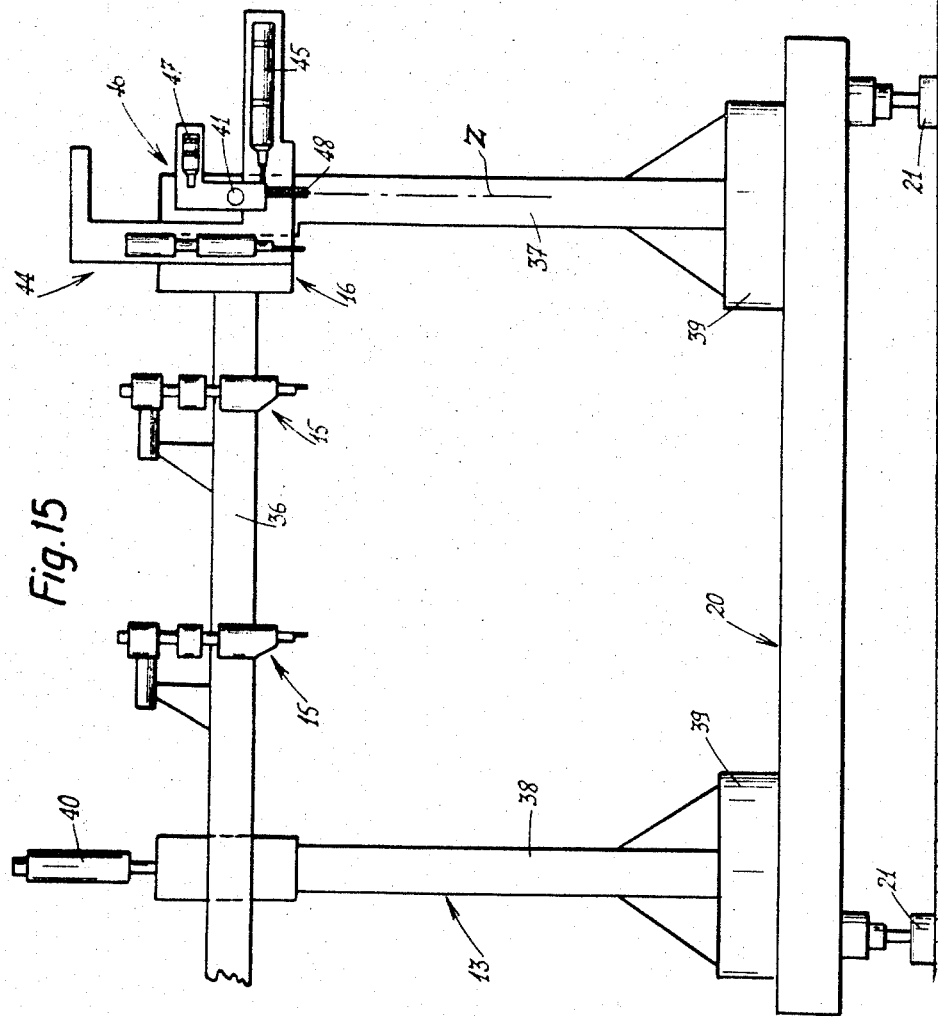
FIG. 15 is a view in elevation of the gantry on which are mounted the means for guiding, fixing and cutting of the sectional strip, the guiding means being omitted for the sake of clarity of the drawings.

The beam 36 of the gantry 13 carries the soldering devices 15 which vary in number such as two or three, for example, as well as the device 16 for cutting the sectional strip (as shown in FIG. 15). Said beam is supported by two columns 37, 38 which are mounted on two bases 39 and these latter are rigidly fixed to the frame 20. The beam 36 is substantially horizontal when it is in the working position, a jack 40 which is mounted on the column 38 being provided for the purpose of lifting the corresponding extremity of the beam and causing this latter to swing about a horizontal shaft 41 which is carried by the column 37.

There is associated with each soldering device 15 an operating jack 42, only on of which has been shown in FIG. 13. A notch 43 corresponding to each soldering device is formed in the strip guide 14 so as to permit the transfer of the soldering element to a point on the glass pane.

The beam 36 also carries the strip guide 14 which is not shown in FIG. 15 for reasons of clarity.

A device for folding-back and soldering the sectional strip at the end of operations is fixed on the cutting device 16. Said device 44 is provided with an operating jack 45.

There is also fixed on the column 37 of the gantry a device 46 which serves to bend the sectional strip and is provided with an operating jack 47. This device is fitted with stop members which will be described in greater detail hereinafter. In particular, a rod 48 which is intended to come into contact with the sectional strip on the inside with respect to the pane is located in alignment with the axis of rotation Z of the arm 30 which carries the suction cup 28.

The device for displacing the pane in pivotal motion as shown in detail in FIG. 16 is provided in addition to the elements which have been mentioned in the foregoing with a sleeve 49 which is rigidly fixed to the arm 30 and rotatably mounted on a pivot-pin 60, thereby defining the axis of rotation Z of the suction cup 28. Said pivot-pin is attached to a support 50 which forms part of the base 39 of the column 37. A rod 51 whose axis is parallel to the axis Z is slidably mounted in the support 50 and can be actuated by two coupled jacks 72, 73. Said rod constitutes the lower portion of the column 37 and serves to adjust the height of the beam 36 as a result of operation of the jacks 72, 73 and a corresponding modification of the height setting of the column 37.

A sleeve 52 which is rigidly fixed to the sleeve 49 contains a sliding rod 53 which is actuated by a jack 54 and returned downwards by a helical spring 55. Said rod whose axis is parallel to the axis Z terminates at its upper extremity in a lug 56 which cooperates with a stop 57, said stop being rigidly fixed to a horizontal plate 58 which is mounted for rotation about the axis Z. The lug 56 and the stop 57 are semi-cylindrical and complementary to each other so that, when the rod is displaced upwards by the jack 54, said rod cooperates with the stop 57. The plate 58 is rigidly fixed to a cylinder 59, these two components being rotatably mounted on the pivot 60. The upper portion of the pivot 60 passes through a bracket 61 which is rigidly fixed to the support 50 and is in contact with the sleeve 49; there is placed between said bracket and the plate 58 a helical spring 62 which is attached to these two components at each extremity and tends to restore angularly the assembly consisting of plate 58 and cylinder 59. Moreover, the column 37 carries a fork 63 which engages in a groove of the cylinder 59 but does not prevent rotation of this latter.

The cylinder 59 is adapted to carry a vertical rod 64 terminating in a comb-shaped stop 65 which is mounted at the edge of the support device and intended to facilitate bending of the sectional strip at the time of rotation of the glass pane.

Figure 17:
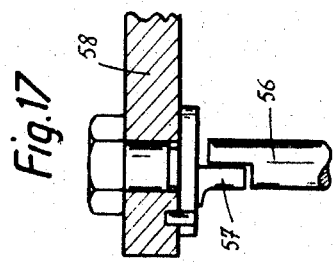
FIG. 17 is an enlarged view of a detail of FIG. 16.

When the rod 53 is in the top position, its lug 56 cooperates as shown in FIG. 17 with the stop 57 and the stop 65 is located in alignment with the edge guides 31, 35 on the outside with respect to the sectional strip and the glass pane. The movable box element 19 is then at the end of travel at the right-hand side in FIG. 13. As a result of translational motion of said box element towards the left, the arm 30 pivots about the axis Z and the sliding rod 53 which is rotationally coupled to the arm 30 and the sleeve 49 also pivots and causes the rotation of the plate 58, the cylinder 59 and the stop 65. In consequence, the stop 65 accompanies the sectional strip at the moment of rotation of the glass sheet and this serves to prevent deformation of said strip. At the end of rotational motion, the jack 54 is released, the spring 55 returns the rod 53 to the bottom position and the lug 56 of said rod moves away from the stop 57. The assembly consisting of plate 58, cylinder 59, arm 64, stop 65 is then returned by the spring 62 to its initial angular position.

Operation of the jacks 72, 73 serves to lift the column 37 and consequently the fork 63 together with the cylinder 59, the rod 64 and the stop 65. By virtue of this arrangement, there is carried out a height-adjustment both of the devices which are carried by the beam 36 and of the stop 65 which is provided for bending the sectional strip. The column 38 is also provided with a pair of jacks which serve to adjust its height in correlation with that of the column 37.

Figure 18:
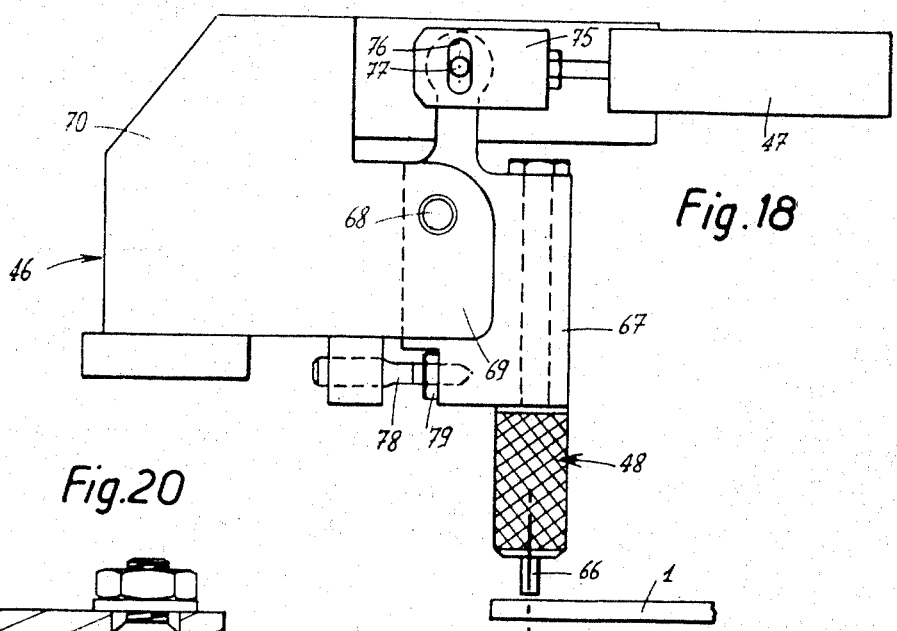
FIG. 18 is a diagrammatic view in elevation of the device for bending the sectional strip.
Figure 19:
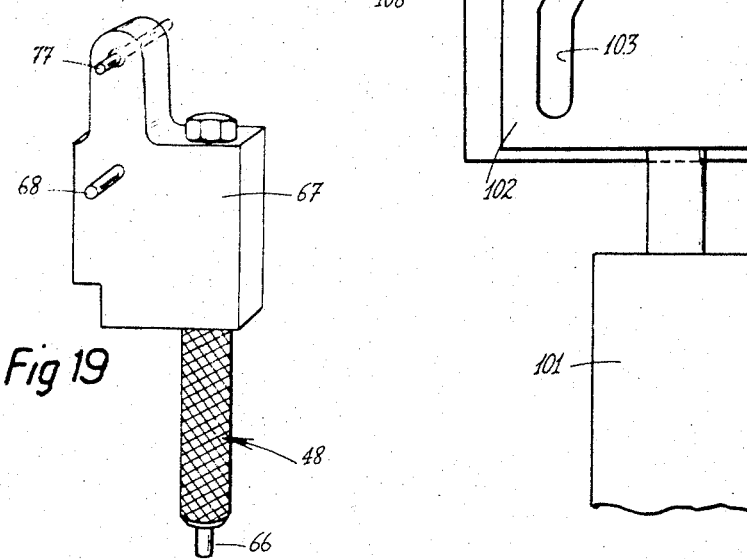
FIG. 19 is a view in perspective showing a portion of the device of FIG. 18.

FIG. 18 illustrates the device 46 for bending the sectional strip together with its operating jack 47. The active element 48 consists of a rod terminating in a stud 66 which cooperates with the stop 65. The rod 48 is mounted in a support 67 which is in turn rotatably mounted on a pin 68 in a yoke 69 which is formed on a block 70. The rod of the operating jack 47 is connected to a slide-block 75 in the form of a yoke and this latter is provided with two elongated slots 76 in which is mounted a pivot-pin 77 for the support 67 (as shown in FIG. 19). As a result of translational motion of the slide-block 75 under the action of the jack 47, the pin 77 slides within the elongated slots 76 of the slide-block, thereby causing rotational motion of the support 67 about the pin 68 towards the horizontal position. In consequence, the rod 48 and the stud 66 carry out a movement of rotation about said pin as they move in the upward direction, thereby permitting the possibility of setting the bending device in the withdrawn or inactive position and conversely of applying the stud 66 against the metallic sectional strip.

A screw 78 which is carried by the block 70 and forms a stationary stop is adapted to cooperate with a movable stop 79 carried by the support 67 so as to permit accurate adjustment of the work position of the stud 66 with respect to the strip P.

Figure 20:
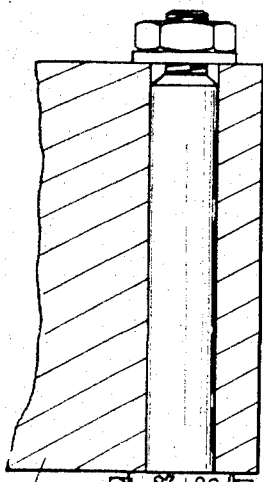
FIG. 20 is a part-sectional view on a larger scale and showing certain elements of the bending device.
Figure 21:
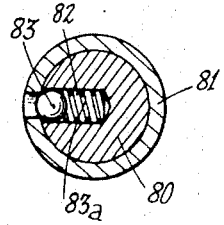
FIGS. 21 and 22 are sectional views taken along lines XXI—XXI and XXII—XXII of FIG. 20 respectively.
Figure 22:
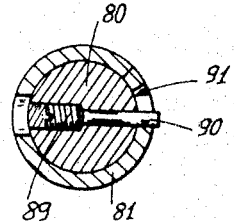
Figure 24:
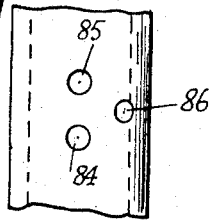
FIGS. 23 and 24 are detail views taken along the arrows f and f' of FIG. 20 respectively.

The structure of the rod 48 and means for obtaining a number of work positions of the stud 66 will now be described in detail. It is apparent from FIG. 20 that the rod 48 has a cylindrical body 80, a sleeve 81 which is closed at one end being fitted over said body and traversed by the stud 66. A radial blind-end bore 82 is formed in the body 80, a ball 83 being housed in said bore and urged outwards by a spring 83a. Said ball corresponds to one of three drilled holes 84, 85 and 86 which are formed in the wall of the sleeve 81 and thus serve to lock the sleeve in position with respect to the body 80. The three drilled holes are located in different horizontal planes and disposed on an isosceles triangle as illustrated in FIG. 24, the intermediate hole 86 being displaced by 45° with respect to the vertical line of the holes 84 and 85. In FIG. 20, the sleeve 81 is in the top position and the ball 83 is adapted to cooperate with the drilled hole 84, thus corresponding to a maximum useful length of the stud 66 above the glass pane 1.

A set-screw 87 which passes through a drilled hole of the sleeve 81 and is engaged in an internally threaded bore of the body 80 serves to lock the stud 66 within the body 80 by being applied against an inclined face 88 which is formed on said stud. The stud 66 is thus rotationally coupled to the rod 48.

Figure 23:
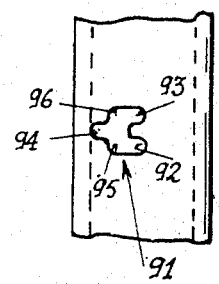

Moreover, the rod 48 is provided with a registering screw 89 which is engaged in a diametral bore of the body 80. The extremity 90 of said screw is designed in the form of a pin or stud 90 and makes it possible to select one of three work positions defined by a slot 91 which is formed in the wall of the sleeve 81. As shown in FIG. 23, said slot is constituted by three recesses 92, 93 and 94, the arrangement being such that the summits of said recesses define an isosceles triangle which corresponds to the triangle defined by the drilled holes 84, 85 and 86. The bottom portions of the recesses 92, 93 and 94 define three work positions whilst the points of junction 95 and 96 define two transitional positions. When the sleeve 81 is in the top position, the registering screw 89 is in the position corresponding to the recess 92 and the ball 83 is engaged in the bottom drilled hole 84. In order to bring the registering screw into the transitional position corresponding to the junction point 95, the ball 83 is released from the drilled hole 84 by exerting a force which is slightly greater than the tension of the spring 83a, the sleeve is rotated through an angle of 22°30 so that the registering screw should occupy the position corresponding to the junction point 95 and the sleeve is lowered over the necessary distance. By rotating the sleeve a second time through an angle of 22°30 in the same direction as the first, the registering screw is then brought to a position corresponding to the bottom of the recess 94. The ball 83 then engages in the intermediate drilled hole 86.

It is evidently possible to move from the position last mentioned to the position which corresponds to the recess 93 by rotating the sleeve through 22°30 in the direction opposite to the two previous movements of rotation, by lowering the sleeve over the necessary distance and carrying out a further rotation through 22°30 in the same direction as before. The ball then takes up the position opposite to the drilled hole 85 which corresponds to the smallest useful height of the stud 66.

Provision is thus made for three work positions which correspond to three different heights of the metallic sectional strip (for example 6, 9 and 12 mm).

In order to prevent any danger of flattening of the sectional strip, the lower end of the sleeve is machined so as to form an angle of relief $x$ which can be of the order of 2° to 4°, for example.

The complete bending device 46 which is carried by the column 37 of the gantry 13 is also adjustable for height according to the thickness of the glass pane to be treated since the column 37 can be adjusted for height as has been stated in the foregoing.

The device 16 for cutting the sectional strip which is illustrated in FIGS. 25 to 28 comprises a stationary support 100, an operating jack 101 and a plate 102 which is displaceable on the support in translational motion in the vertical direction under the action of the jack, said plate being guided by means of slideways (not shown in the drawings).

The assembly is carried by the beam 36 of the gantry 13.

The plate 102 is provided with slots 103, 104 defining cam surfaces for rollers 105, 106 which are guided by means of said slots. The roller 105 is rigidly fixed to a slide-block 107 which carries a cutting key 108. The roller 106 is rigidly fixed to a slide-block 109 which serves to operate a rectractable stop; a stop support 111 which is adapted to carry the retractable stop 112 at the lower portion thereof is pivotally mounted on the slide-block 109 by means of a pin 110. The support 111 is also rotatably mounted on a pin 113 which is carried by the support 100. There is also keyed on said pin 113 a blade-holder 114 to which is secured a cutting blade 115 having two inclined edges 115a, 115b. The two slide-blocks 107 and 109 are capable of horizontal displacement in translational motion while the plate 102 is guided by means of slideways (not shown).

Figure 26:
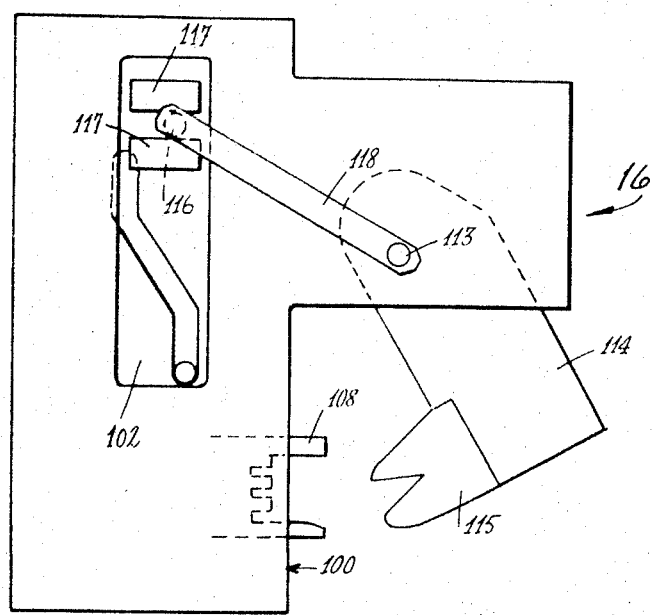
FIG. 26 is a view which is similar to FIG. 25 but on the opposite side.

On the opposite side, a roller 116 moves within guides consisting of two small plates 117 which are rigidly fixed to the plate 102; the roller and the small plates 117 are shown in FIG. 26 in which the support 111 and stop 112 have been omitted.

The roller 116 is rigidly fixed to a flat link-arm 118 which is keyed on the pivot-pin 113 so that the blade-holder 114 and the link-arm 118 are rotationally coupled to the pin 113 whilst the stop support 111 is mounted independently for rotation about said pin.

Figure 25:
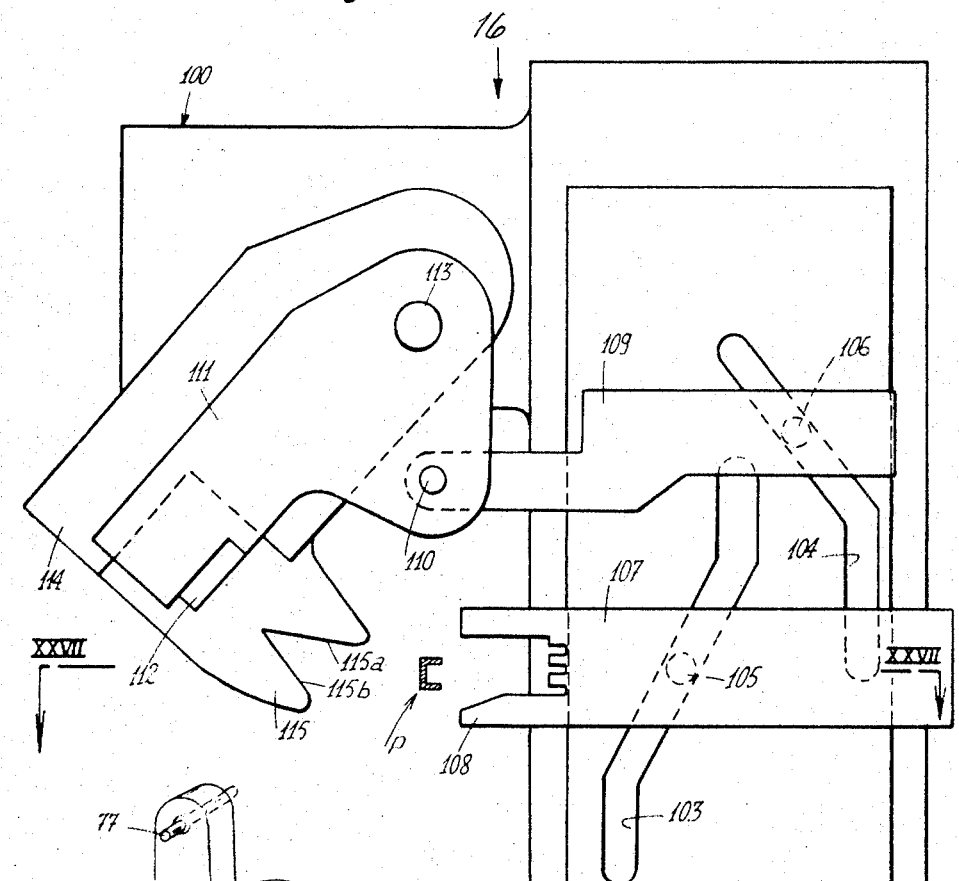
FIG. 25 is a diagrammatic side view of the device for cutting the sectional strip.

At the level of the cutting device, the sectional strip P is no longer supported by the guide 14. The plate 102 which is lifted under the action of the jack 101 causes translational displacement of the slide-blocks 107 and 109 by means of cam surfaces 103 and 104, the first slide-block being displaced towards the sectional strip P and the second slide-block being displaced in the opposite direction as shown in FIG. 25. In consequence, the slide-block 109 causes a rotation of the stop support 111 about the pin 113 so as to bring the retractable stop 112 against the sectional strip P on the side opposite to the cutting key 108. Under the action of the slide-block 107, the cutting key 108 then moves towards the sectional strip, fits closely over this latter and maintains said strip in position against the stop 112. The small plates 117 which are rigidly fixed to the plate 102 produce a displacement of the roller 116 towards the right-hand side in FIG. 26 and therefore a movement of rotation of the blade support 114 in the same direction as the stop support 111. As a result, the blade engages in the cutting key, the arrangement of the cam surfaces 103, 104 and of the small plates 117 being such that said blade engages shortly after the stops 112 and the cutting key 108 have come into contact with the sectional strip P. The inclined edges 115a and 115b of the blade make it possible to obtain a progressive cutting action on the sectional strip.

Figure 27:
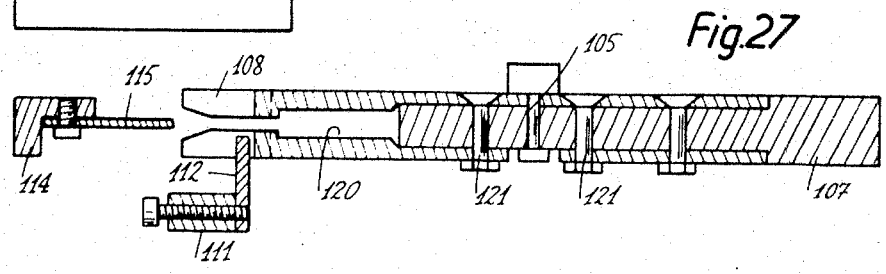
FIG. 27 is a part-sectional view taken along line XXVII—XXVII of FIG. 25.

In FIG. 27, it is seen that the cutting key 108 has an enlarged portion 120 which is intended to assist expulsion of shavings and removal of these latter under the action of gravity. In this figure, the blade 115 and its support 114 are shown as being displaced towards the left for reasons of clarity. The cutting key 108 is attached to the slide-block 107 by means of screws 121.

Figure 28:
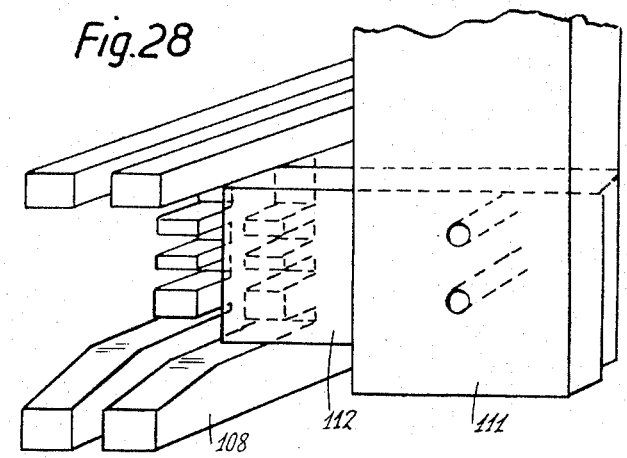
FIG. 28 is a view in perspective showing a portion of the cutting device.

FIG. 28 shows the cutting key 108 and the stop 112 when these two components are brought together to perform the cutting operation, the blade having been omitted from the figure. The stop 112 maintains the sectional strip applied against the key only on one side of the cutting plane; this does not constitute a disadvantage since the sectional strip is positionally maintained on the other side by the guide 14 which terminates immediately before the vertical plane in which the cutting blade 115 performs a pivotal motion. The cutting key 108 has the shape of a comb in the same manner as the stop 65 in order to permit the use of sectional strips having different heights.

Referring to FIGS. 29 and 30, one of the soldering devices 15 which are carried by the beam 36 will now be described.

An articulation support 130 for the soldering device is fixed on the beam 36. A vertically disposed plate 131 carries by means of a right-angled member 132 two rods 133, 134 which are connected to each other by means of a keyed pin 135 and which are capable of sliding in guides 136 and 137 respectively, said guides being carried by the plate 131. The rod 133 is connected to an operating jack 138 which is carried by the right-angled member 132.

The rod 134 is adapted to carry an insulating block 139 to which is fixed a heating block 140. A heating resistor 141 is embedded in the heating block and the lower end of said block constitutes a soldering tip 142 which is intended to join the lower flange of the sectional strip P to the glass pane 1 by soldering at one point.

The rod of the operating jack 42 is located to the rear of the plane of FIG. 29 but is disposed parallel to said plane. The support 130 is traversed at the upper end thereof by a horizontal pin 143 which is located at right angles to the rod 133 and also passes through the upper portion of the plate 131. The jack 42 serves to carry out a movement of rotation of the plate 131 and of the components carried by this latter about the pin 143 by means of a stud 144 which is rigidly fixed to the plate 131 and by means of an elongated slot 145 (as shown in FIG. 30) which is formed in the extremity of the rod of the jack 42 and in which the stud 144 is engaged, the intended clearance being slightly exaggerated in the figure. A screw 146 which is engaged in the guide 137 makes it possible to prevent rotation of the rod 134 about its longitudinal axis.

Two helical restoring springs produce action so that one spring 147 urges the rod 133 to the top position whilst the other spring 148 urges the rod 134 to the bottom position, the lower end of the rod 133 which is connected to the rod 134 being provided with an elongated slot 149 whose vertical dimension is larger than the diameter of the pin 135.

In the inactive or rest position of the soldering device 15, the jack 42 maintains the plate 131 in the rearwardly retracted position with respect to the glass pane so that the soldering tip 142 is located at a distance from the sectional strip P. As a result of operation of the jack 42 which displaces the soldering device in rotational motion towards the sectional strip P, the plate rotates about the horizontal pin 143 and the welding tip 142 takes up the position shown in FIG. 29 to within a few millimeters above the bottom flange of the sectional strip. The jack 138 is then actuated so as to displace the rod 133 in the downward direction; at this moment, the rod compresses the spring 147, with the result that the rod 134 is displaced downwards by the restoring spring 148. After a displacement over a distance of a few millimeters, the tip 142 comes into contact with the lower flange of the sectional strip and exerts on this latter a pressure which is transmitted by the spring 148. As soon as the soldering tip has come into contact with the sectional strip, the downward motion of the rod 134 is practically discontinued even if the rod 133 has not come to a stop. This uncoupling of the two rods is possible by virtue of the elongated slot 149 in which the pin 135 is engaged. A constant soldering pressure can thus be exerted under the action of the spring 148 irrespective of the dimension of the metallic sectional strip and any possible surface irregularities of the lower flange of said strip. On completion of the soldering operation, the jack 138 is released and the rod 133 is returned upwards under the action of the restoring spring 147, thereby displacing the rod 134 which compresses its restoring spring 148. It is apparent that the spring 147 is more powerful than the spring 148, the first spring being calibrated by way of example at 1.5 kg and the second spring at 1 kg. Finally, the jack 42 can be actuated so that the complete soldering device can again be moved away to the inoperative position.

FIG. 31 illustrates the strip guide 14 which is rigidly fixed to the beam 36 by means of screws, for example. Said guide essentially comprises two plates, namely a horizontal plate 150 which is attached to the beam and a vertical plate 151 which can be secured to the first at right angles on the side corresponding to the support device and therefore on the same side as the glass pane 1. Three small plates 152 separated by blades 153 which project to a slight extent in front of the small plates are screwed behind the plate 151; the lowermost small plate also has a projection which is located approximately at the level of the blades 153. It is thus possible to guide and to support sectional strips P having three different dimensions since the three small plates 152 and the two blades 153 serve to define three grooves for guiding at different levels.

Figure 32:
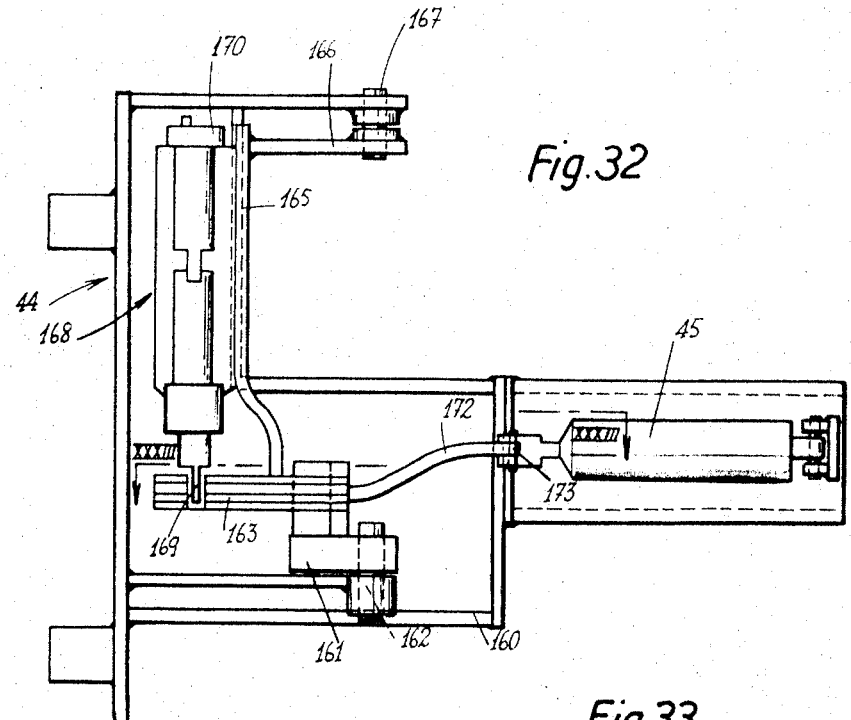
FIG. 32 is a diagrammatic view in elevation showing the device for folding-back and fixing the sectional strip.
Figure 33:
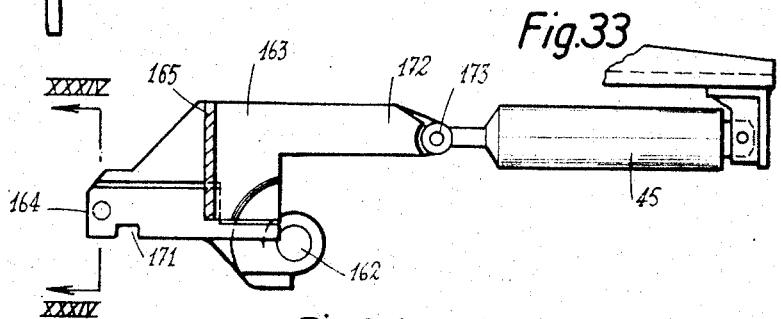
FIG. 33 is a part-sectional plan view of a portion of the device of FIG. 32, this view being taken along line XXXIII—XXXIII of FIG. 32.
Figure 34:
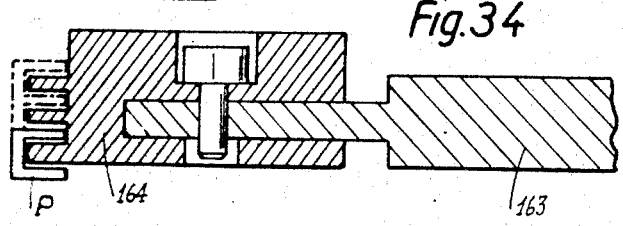
FIG. 34 is a part-sectional view taken along line XXXIV—XXXIV of FIG. 33 but on a larger scale.

FIGS. 32 to 34 illustrate the device for folding back and soldering the sectional strip P at the end of operations. This device 44 comprises a support 160 which is attached to the support 100 of the cutting device 16 (not shown in FIG. 32). A carrier-plate 161 is mounted for rotation on the support 160 about a pivot-pin 162, the axis of which is in the line of extension of the axis Z which was defined earlier. Said plate 161 is adapted to carry a leaf 163 which is disposed practically horizontally and at one end of which is fixed a guiding member in the form of a comb 164, said comb being so arranged as to correspond in shape to the sectional strip P, as shown in FIG. 34. A substantially vertical rod 165 which is rigidly fixed to the leaf 163 is provided at the upper extremity thereof with an arm 166 and this latter is rotatably mounted on a pivot-pin 167 which is coaxial with the pivot-pin 162. A soldering device 168 which is similar to the above-described soldering devices 15 is secured to said rod. The soldering tip 169 and the operating jack 170 of said soldering device are especially worthy of note. The guiding member 164 has a recess 171 (FIG. 33) through which the soldering tip 169 is permitted to pass. The operating jack 45 of the device 44 is connected to a curved extension 172 of the leaf 163 by means of an articulation 173.

It is apparent that, by actuating the jack 45 towards the left-hand side in FIG. 32, the leaf 163 and the carrier-plate 161 perform a pivotal movement about the pin 162, that is to say about the axis Z. The free extremity of the sectional strip P which has been cut is then folded back through approximately 90°, whereupon the soldering device 168 is put into operation under the action of the jack 170, the soldering tip 169 being brought into contact with the lower flange of the sectional strip P. On completion of the soldering operation, the jacks 170 and 45 are released successively so that the moving assembly of the folding-back and soldering device is returned to the initial position of rest.

The operation of the complete apparatus for fixing an intercalary sectional strip on a glass pane will now be described.

It is first assumed that the apparatus has been adjusted for the thickness of the glass pane to be treated by means of the jacks 72 and 73 which are associated with the column 37 of the gantry 13 and by means of the similar jacks which are associated with the column 38 as well as for the height of the sectional strip which is employed by operating the sleeve 81 of the rod 48 of the strip-bending device 46.

It will further be assumed that the strip is engaged in its guide 14 in the position indicated in FIG. 1 in connection with the method of attachment. The sectional strip P has been brought into this position either by hand or automatically during the treatment of a previous glass pane.

The glass pane 1 on which an intercalary sectional strip is intended to be fixed is directed towards the upstream portion of the apparatus, that is to say towards the left-hand portion in FIG. 13. Said pane is delivered from a supply table which is placed in the lengthwise direction of the apparatus, for example (said table having been omitted from the drawings). The supply table can be fitted with rollers which serve to displace supporting bands for the successive longitudinal transfer of the glass panes to be treated in order to deposit a pane on a support plate which lifts said pane and is tilted towards the apparatus in such a manner as to cause the pane to slide towards the lifting device 10.

The glass pane is supported as soon as it arrives on said lifting device or in other words on the box elements 17 – 19 on which an air cushion is produced at the surface of said elements by means of blowers 22.

Since the frame 20 of the apparatus is slightly inclined by means of the jacks 21 in the direction of the edge guides 31 and 32 which are then located in the work position, the glass pane slides towards the stops and the rollers of said edge guides and is thus perfectly centered. The air cushion is then suppressed and the pane rests on the box elements, one side such as a short side of the pane, for example, being applied against the edge guide 32 and a long adjacent side being applied against the perpendicular edge guide 31.

At the time of transfer of the pane to the lifting device, the carriage 11 is located on the left-hand side in FIG. 13 and the movable box element 19 is at the end of travel near the right-hand side in this figure so that the rod 29 which supports the suction cup 28 is located on the right-hand side with respect to the edge guide 32 as shown in FIG. 13. It will be noted that the air cushion extends over practically the entire surface of the lifting device except for the elongated slot 27 which is formed in the movable box element 19; moreover, the carriage 11 only constitutes a narrow non-supporting band which has a practically negligible effect. Before the glass is applied against the edge guides 31 and 32, the beam 36 of the gantry 13 is lifted by actuating the jack 40 so that the different devices carried by said beam do not hinder the positioning of the pane.

During this operation, the soldering device 15, cutting device 16, bending device 46, folding-back and soldering device 44 therefore take up an inactive position of rest in which said devices are located at a distance from the glass pane. The same applies to the stop 65 which comes into operation at the time of bending, said stop being located in alignment with the edge guide 31 as has been noted with reference to FIG. 16.

Once the glass pane has been centered and secured in the correct position, the carriage 11 is displaced in translational motion so as to come into position underneath the pane; and the suction cups 25 of said carriage or only a few of said cups depending on the dimensions of the pane accordingly take hold of this latter. The jack 40 is then actuates so as to return the beam 36 to a substantially horizontal position or in other words to the active position. The metallic sectional strip which is maintained by its guide 14 is then applied against the top face of the glass pane. The air cushion is re-established and the assembly consisting of pane and sectional strip thus takes up the position shown in FIG. 1, the lower flange of the strip being in contact with the metallic coating which has previously been deposited on the glass pane.

The jacks 42 of the soldering devices 15 are then actuated so as to move said devices towards the sectional strip; the soldering tips 142 being placed between the flanges of the strip (as shown in FIG. 29). Under the action of their jacks 138, the soldering devices perform the soldering operation at a point of the lower flange of the strip on the long side of the pane. It will be noted from FIG. 1 that this operation is carried out in the direction of the arrows G, that is to say at three points. The soldering tips are then lifted over a distance of a few millimeters and then moved away from the sectional strip as has already been noted earlier.

Since the first side of the pane which has been fitted with a portion of strip is a long side, the three soldering devices 15 have been employed. In the case of the following side which is a short side, only two of these devices will be employed.

During the soldering operation or after this operation, the edge guides 31 and 32 are moved away from the adjacent sides of the glass pane, lifting of the edge guide 35 being also carried out in order to permit of subsequent translational motion of the pane.

The carriage 11 is then displaced towards the right in FIG. 13, namely beyond the edge guide 32. The glass pane which is supported by the air cushion is therefore displaced in translational motion as shown in FIG. 2. The carriage stops when the rear side of the pane is located at the level of the edge guide 32, that is to say after a translational displacement which is substantially equal to the long side of the pane. The glass pane is accompanied in this movement by the sectional strip P which slides within its guide 14.

When the glass pane is fixed in position, the suction cup 28 of the device 12 which serves to carry out the pivotal movement of the pane lifts to a slight extent in order to take hold of said pane. The suction cups 25 of the carriage 11 are placed in the inactive position and said carriage returns to its initial position as shown in FIG. 13.

The jack 47 of the device 46 for bending the sectional strip is then actuated so that the rod 48 then takes up a substantially vertical position in which the stud 66 comes into contact with the sectional strip P on the inside with respect to the pane, this position being shown at 5 in FIG. 2. The beam 36 is lifted under the action of the jack 40, whereupon the movable box element 19 is displaced in translational motion towards the left in FIG. 13, with the result that the suction cup 28 together with the glass pane are displaced in rotational motion about the axis Z. The air cushion which is still maintained facilitates the pivotal motion of the pane to an appreciable degree. Rotation is carried out substantially through an angle of 90° as shown in FIG. 3. A short side of the glass pane is then in contact with the edge guide 31 whilst the long side which is fitted with its portion of strip is located substantially at the height of the edge guide 32. This position is illustrated in FIG. 4.

As has been noted in the foregoing, the stop 65 which carries out a movement of rotation about the axis Z (as shown in FIG. 16) but on the other side of the sectional strip with respect to the stud 66 follows the rotation of the pane and prevents any deformation of the sectional strip. As soon as the rotation is completed, said stop moves back in order to take up its initial position under the action of the restoring spring 62.

The glass pane being again locked in position, the carriage 11 is displaced so as to come beneath the pane and the suction cup 25 of said carriage take hold of said pane. The suction cup 28 is put into the inactive position and the movable box element 19 is displaced in translational motion towards the right in FIG. 13, with the result that the rod 29 and the suction cup 28 return to their initial positions.

As soon as the glass pane is held by the suction cups 25 of the carriage, the beam 36 is lowered in order that the sectional strip should come into contact with the glass pane along the short side. The operation which consists in soldering a portion of the strip is then carried out at two points as illustrated in FIG. 4 by means of two of the soldering devices 15.

The cycle of operations described above is repeated in the case of the following sides as shown in FIGS. 5 to 8. The air-cushion is maintained throughout all the operations of translational motion, rotation and soldering. Moreover, starting from the initial rotation of the pane, the rod 48 of the bending device remains in the work position.

When the operation which consists in fixing the intercalary sectional strip 2 on the glass panel 1 is almost completed, that is to say in the position shown in FIG. 8, the cutting device 16 is set in operation. At this moment, the pane is located slightly downstream of the cutting device, the center of rotation being located substantially in the rear corner of the pane which is adjacent to the strip guide. It is seen from FIG. 8 that the length of strip which extends between the rear of the pane and the cutting point 6 must be equal to the length L which has been left free along the first side of said pane as shown in FIG. 1.

The jack 101 is then actuated in such a manner as to ensure that the stop 112 and the cutting key 108 come into position on each side of the sectional strip P (as shown in FIG. 25) immediately before the blade 115 cuts said strip. As soon as the cutting operation has been carried out, the jack 101 is released so that the stop 112 and the blade 115 rise again and the key 108 moves away from the strip.

It then remains necessary to bend the cut strip around the point 5 and to close the intercalary strip 2 which is fixed on the glass pane. The jack 45 is actuated so as to effect the rotation of the leaf 163 which supports the guiding member 164 as well as the soldering device 168. This rotation is carried out about the axis Z which therefore corresponds to the point 5 of FIG. 9 and makes it possible to fold back the free extremity of the cut strip around the stud 66, the position of which has not changed since the initial rotation of the pane.

The soldering device 168 then comes into action in order to form a local bond by soldering said extremity of the intercalary strip which is finally fixed on the pane as shown in FIG. 10.

In the inoperative position of the soldering device 168, the soldering tip 169 can remain close to the sectional strip since this latter remains in the vicinity of said tip only for a short period of time. On the other hand, the soldering tips 142 of the soldering devices 15 must be moved away from the strip since the contact times could be relatively long, in particular when the apparatus is being supplied with glass panes.

As soon as the sectional strip has been soldered, the folding and soldering device 44 is returned to the inoperative position by the jack 45 whilst the bending device is lifted by rotation about the horizontal pin 68.

The suction cup 28 releases the glass pane and the edge guide 35 is returned to the work position. Tilting of the lifting device of the apparatus permits removal of the pane which is still supported by the air cushion towards the right-hand side of the apparatus in FIG. 13. The edge guides 31 and 32 are returned to the work position and the apparatus is ready to receive a fresh glass pane.

A noteworthy advantage arises from the fact that the non-lifting surface is limited to that of the elongated slot 27 of the movable box element 19, this surface being practically negligible. Moreover, at the time of introduction of a glass pane on the apparatus, the suction cup 28 is located on the right-hand side of the edge guide 32 in FIG. 13, with the result that the air cushion is formed over the entire left-hand portion of the supporting device except for the very narrow band which is delimited by the carriage 11.

For the purpose of driving the movable box element 19 and the carriage 11, use is preferably made of hydraulic motors which are regulated by means of an electric motor of the step-by-step type. The essential feature of these motors lies in the fact that their stopping point is highly reliable, thereby preventing any possibility of positional variation at the time of centering of a glass pane. Moreover, in order to prevent sliding of the movable box element 19 and of the carriage 11 under the action of their own weight, the chains or like components which serve to drive these latter must be continuously under tension. This can be obtained by employing friction systems of the disc type, for example.

If so required, it is also possible to incorporate devices of known type such as contactors in order to achieve a higher degree of accuracy in positioning of the glass panes.

What we claim is:

1. An apparatus for fixing an intercalary sectional strip on a rectangular glass pane, comprising a support device for the glass pane which comprises a stationary table, a carriage which is displaceable in translational motion and adapted to displace the glass pane above the table in one direction, means for pivoting said glass pane in its plane about a stationary point, means for guiding the sectional strip on one side of the support device in said one direction, means for fixing said sectional strip on the pane, means for pivoting and for bending the sectional strip at a corner of a glass pane, and means for cutting said strip.

2. An apparatus according to claim 1, wherein the guiding means, the fixing means and the strip-cutting means are mounted on the beam of a gantry which is arranged on one side of the support device.

3. An apparatus according to claim 2, wherein the gantry beam is pivotally mounted at one end in order that said guiding means, fixing means and said strip-cutting means for "lifting"; can be moved away from the support device in the inactive position.

4. An apparatus according to claim 1, wherein the means for causing pivotal displacement of the glass pane comprises a movable table which also forms part of the support device, said table being capable of translational motion parallel to the carriage and provided with an opening in the form of an elongated slot, an element for holding the pane being engaged in said slot and mounted for rotation about an axis located at right angles to the plane of the table.

5. An apparatus according to claim 4, wherein the support device comprises a second stationary table, the carriage and the movable table being arranged between the two stationary tables.

6. An apparatus according to claim 4, wherein the support device comprises means for forming an air cushion at the surface of the tables.

7. An apparatus according to claim 1, wherein means for folding-back and fixing the sectional strip after cutting are mounted on the gantry.

8. An apparatus according to claim 4, wherein the means for bending the sectional strip comprises a rod placed in alignment with the axis of rotation of the holding element and adapted to come into contact with the sectional strip on the inside with respect to the glass pane.

9. An apparatus according to claim 8, wherein a stop which can be rotationally coupled to the holding element is adapted to cooperate with the rod by coming into contact with the sectional strip on the outside with respect to the glass pane.

10. An apparatus according to claim 8, wherein the length of useful rod is adjustable.

11. An apparatus according to claim 9, wherein the gantry beam and the stop are adjustable for height.

12. An apparatus according to claim 1, wherein the means for fixing the sectional strip are constituted by devices for soldering at one point.

13. An apparatus according to claim 7, wherein the means for folding-back and fixing the sectional strip after cutting comprise a strip-guiding member which is displaceable in rotation about an axis which forms an extension of the axis of rotation of the holding element, and a device for soldering at one point which is rotationally coupled to the guiding member.

14. An apparatus according to claim 12, wherein each soldering device comprises a heating block terminating in a soldering tip, a mechanical system for displacing the heating block and a heat-insulating block interposed between said mechanical system and said heating block.

15. An apparatus according to claim 14, wherein the mechanical system comprises two slidably mounted rods which are connected to each other with play and urged elastically in opposite directions, and an operating device which produces action on the rods in the direction of displacement of the heating block.

16. An apparatus according to claim 4, wherein the means for fixing the sectional strip comprises devices for soldering at one point, and wherein said soldering devices and the devices for bending the sectional strip are displaceable in rotation about respective pins which are located at right angles to the axis of rotation of the holding element.

17. An apparatus according to claim 1, wherein the cutting means comprise a cutting key which is carried by a first slide-block, a cutting blade which is pivotally mounted on a stationary support and a stop which is pivotally mounted on a second slide-block as well as on the stationary support, the slide-blocks being displaceable in translation in order that the stop, the cutting key and the cutting blade should come into contact successively and in this order with the sectional strip.

18. An apparatus according to claim 17, wherein the cutting blade is rigidly fixed to an actuating arm connected to a member which is capable of displacement in translational motion and in which are formed cam surfaces for controlling the displacement of the slide-blocks.

19. An apparatus according to claim 10, wherein the rod is fitted within a sleeve provided with drilled holes located at different heights and associated with a spherical locking element which is housed within the rod and urged towards the exterior, registering means being provided for selecting a predetermined drilled hole and consequently for adjusting the length of useful rod.

20. An apparatus according to claim 19, wherein the registering means comprise a screw carried by the rod and engaged in an elongated slot of the sleeve which forms recesses so arranged as to correspond to the arrangement of said drilled holes.

* * * * *